United States Patent [19]

Schiel et al.

[11] Patent Number: 5,003,863
[45] Date of Patent: Apr. 2, 1991

[54] CYLINDER-PISTON UNIT FOR DISPLACING A ROLL AT RIGHT ANGLES TO ITS LONGITUDINAL AXIS

[75] Inventors: Christian Schiel; Paul Hafner, both of Heidenheim, Fed. Rep. of Germany

[73] Assignee: J. M. Voith GmbH, Fed. Rep. of Germany

[21] Appl. No.: 345,437

[22] Filed: May 1, 1989

[30] Foreign Application Priority Data

Apr. 30, 1988 [DE] Fed. Rep. of Germany ....... 3814754

[51] Int. Cl.$^5$ .............................................. F01B 1/02
[52] U.S. Cl. .................................... 92/61; 92/126; 92/146; 92/161; 92/167; 92/193; 100/170
[58] Field of Search ...................... 92/146, 161, 161.5, 92/167, 178, 193, 197, 198, 61, 126; 100/170

[56] References Cited

U.S. PATENT DOCUMENTS

| | | | |
|---|---|---|---|
| 1,761,982 | 6/1930 | Dunning | 92/193 |
| 2,064,756 | 12/1936 | Janeko | 92/178 |
| 2,080,297 | 5/1937 | Young | 92/193 |
| 2,208,782 | 7/1940 | Workman | 92/193 |
| 2,852,097 | 9/1958 | Proctor . | |
| 2,897,783 | 8/1959 | Drexler | 92/146 |
| 3,090,315 | 5/1963 | Milton | 92/193 |
| 3,442,183 | 5/1969 | Howe et al. | 92/193 |
| 3,466,054 | 9/1969 | Berg | 92/178 |
| 4,255,930 | 3/1981 | Natalie | 92/85 B |
| 4,796,452 | 1/1989 | Schiel | 100/170 |
| 4,800,802 | 1/1989 | Rebman | 92/61 |

FOREIGN PATENT DOCUMENTS

| | | | |
|---|---|---|---|
| 2308291 | 8/1974 | Fed. Rep. of Germany . | |
| 2514778 | 10/1975 | Fed. Rep. of Germany . | |
| 3237153 | 5/1983 | Fed. Rep. of Germany . | |
| 3633807 | 4/1988 | Fed. Rep. of Germany . | |
| 0512312 | 6/1976 | U.S.S.R. | 92/193 |
| 0976127 | 11/1982 | U.S.S.R. | 92/193 |

Primary Examiner—Edward K. Look
Assistant Examiner—Thomas Denion
Attorney, Agent, or Firm—Ostrolenk, Faber, Gerb & Soffen

[57] ABSTRACT

Located in a stationary frame is a cylinder-piston unit, the piston of which is adapted to displace the bearing housing of a roll in a paper-making machine at right angles to the longitudinal axis thereof. The bearing housing is guided in the frame with the aid of linear guide-elements. The radial play between the piston and the cylinder-bore is greater than the transverse play between the said linear guide-elements. Furthermore, the axial length of the piston is less than the depth of the cylinder-bore. Whenever the cylinder-piston unit is relieved of its load, and the cylinder thus returns to its position of rest, it is centered in the cylinder-bore by means of a centering device.

10 Claims, 3 Drawing Sheets

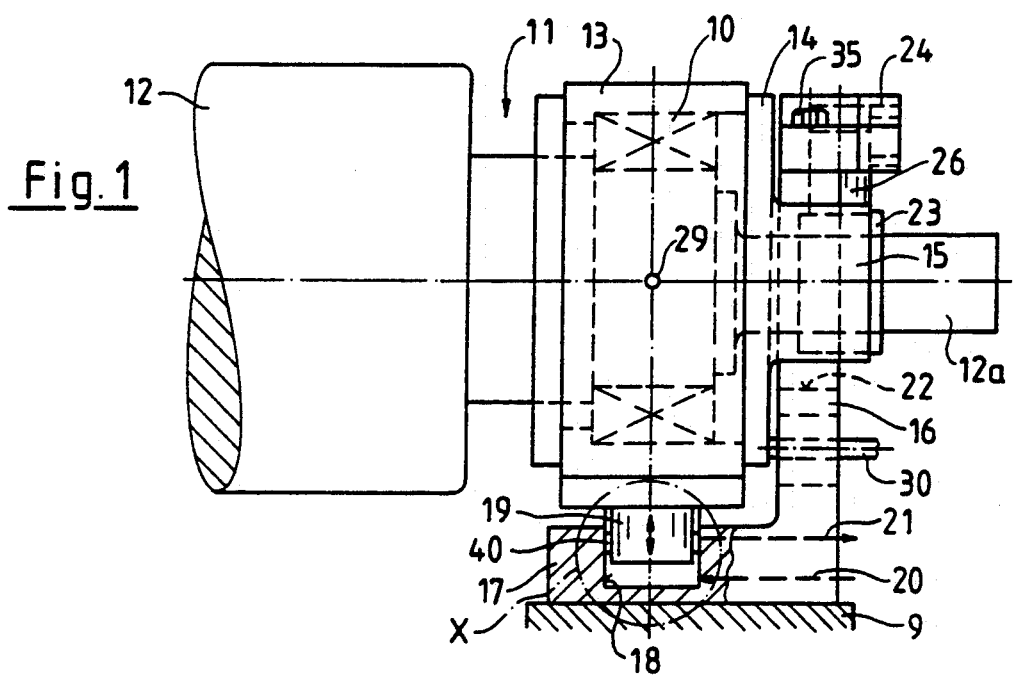

CYLINDER-PISTON UNIT FOR DISPLACING A ROLL AT RIGHT ANGLES TO ITS LONGITUDINAL AXIS

The present invention relates to a cylinder-piston unit for displacing a roll at right angles to the longitudinal axis thereof.

In one known apparatus of this kind (DE-OS No. 3,610,107=U.S. Pat. No. 4,796,452), each of the ends of the rolls is mounted in a bearing housing which can be displaced linearly in a frame with the aid of linear guide-elements. This linear displacement takes place in parallel with a press-plane which is determined by the axes of the roll and of a counter-roll. This makes it possible to bring the roll into contact with the counter-roll and to press them together, and also to move them apart. Provided for the purpose of this displacement of the roll, in each bearing housing, is a single-acting cylinder-piston unit, the piston of which bears directly or indirectly against the bearing housing which is displaced by the force of the piston. The cylinder-piston unit preferably operates from bottom to top, i.e. against the force of gravity. (For this reason, the piston is frequently referred to hereinafter as a "lifting piston"). If the cylinder-piston unit is unloaded, i.e. pressureless, the bearing housing rests upon the cylinder-piston unit.

One preferred application for equipment of this kind is in the wet-presses or glazing rollers of papermaking machines. Another use is in synthetic-material calender or rolling mills.

The structural height of the known cylinder-piston unit is extremely low. The outer end-face (the "operating face") of the piston engages directly with the bearing housing, or with an intermediate element located between the piston and the bearing housing. The operating face of the lifting piston is not rigidly connected to the bearing housing or to the intermediate element. However, there is a frictional connection (at right angles to the direction of movement of the lifting piston) between the operating face of the lifting piston and the bearing housing.

As usual, the diameter of the cylinder bore is slightly greater than that of the piston, so that a narrow annular gap exists between the cylinder-bore and the piston, permitting a small amount of "play" between the piston and the cylinder-bore at right angles to the axis thereof. This play (i.e. the difference between the diameters of the cylinder-bore and of the piston) has hitherto been kept as small as possible, in order to ensure satisfactory guidance of the piston.

It is also obvious that the linear guide-elements, guiding the bearing housing in the frame, must also have a certain amount of play at right angles to the direction of displacement of the roll. In other words, there may be a slight transverse displacement of the bearing housing in relation to the frame. Furthermore, under certain circumstances, there is a danger of the bearing housing carrying out a tilting movement within certain limits. An additional problem may be that, as a result of machining inaccuracies or deformation, of the frame for example, the axis of the cylinder-bore may not always be exactly in parallel with the direction in which the linear guide-elements run.

For these reasons, and because of the already mentioned fact that a frictional connection exists between the piston and the bearing housing (or the intermediate element), it occurs that, when the unit is in operation (i.e. when the piston is displaced longitudinally), the piston is forced out of its normal position coaxial with the cylinder-bore, i.e. the piston has to take part in a possible transverse displacement of the bearing housing. As a result of this, there is a danger of contact between the metallic surfaces of the piston and the cylinder-bore. Should the bearing housing tilt, the piston again follows this movement of the bearing housing, thus making it possible for edge-pressures to arise between the piston and the cylinder-bore. This subjects the known cylinder-piston unit to increased wear. Furthermore, the additional frictional forces arising in the cylinder-piston unit falsify the level of the desired pressure force in the press nip between the roll and the counter roll.

The above-mentioned DE-OS No. 3,610,107 discloses various ways of overcoming the aforesaid disadvantages. For example, it was proposed to provide, on the underside of the bearing housing, an additional guide-pin 32 adapted to slide in a guide-bore in the frame. However, this proposal would also give rise to additional frictional forces. As an alternative, it was proposed to secure the lifting piston to the bearing housing, in order to transfer an additional guiding function to the cylinder-piston unit, but even this failed to solve the problem. Finally, mention is made of the correct notion, namely that the linear guide-elements alone should guide the bearing housing and that they should, therefore, be made as long as possible. However this arrangement alone cannot solve the problem completely, because the frictional connection (between the piston and the bearing housing, for example) can still force the piston out of its central position.

The present invention is directed towards improvement in a cylinder-piston unit for displacing the bearing housing for a rotatable roll at right angles to the longitudinal axis thereof, with the displaceable bearing housing being arranged in a stationary frame accommodating the piston-cylinder unit and being guided therein by means of linear guide-elements extending in the direction of displacement, in such a manner as to prevent, in a reliable manner, contact between the metallic surfaces of the piston and the cylinder-bore.

The improvement in the above-noted cylinder piston unit to which the present invention is directed is a combination of features, as follows:
(a) the stationary frame comprising a cylinder-bore, the axis of which runs in the direction of displacement, and which contains an axially-mobile piston, the outer face of which engages, directly or indirectly, with the bearing housing;
(b) the diameter of the cylinder-bore is greater than the diameter of the piston, thereby providing, between the cylinder-bore and the piston, an annular gap in which the resilient sealing rings are arranged;
(c) the difference between the diameters of the cylinder-bore and that of the piston is greater than the greatest possible amount of play of the linear guide elements at right angles to the direction of displacement of the bearing housing;
(d) the axial length of the piston is less than the depth of the cylinder-bore; and
(e) a centering device engages with the piston in such manner that, in the unloaded condition of the cylinder-piston unit, the piston is centered in the cylinder-bore.

The invention, therefore, resides in a combination of features. In the first place, the diameters of the cylinder-bore and the piston are matched in such a manner that radial play (also known as "transverse play") between the piston and the cylinder-bore is greater than that between the bearing housing and the frame. Since, in addition to this feature, the axial length of the piston is less than the depth of the cylinder-bore, axial play between the piston and the bearing housing (or the above-mentioned intermediate element) also is present when the cylinder-piston unit is in the unloaded condition. This feature makes it possible for the piston to release itself from the bearing housing (or the intermediate element) whenever it rests upon the bottom of the cylinder. The above-mentioned frictional connection is released, so that the centering device now comes into effect and can centre the piston in the cylinder-bore with relatively little transverse force.

There are many possible designs of centering device. It is theoretically conceivable for the elasticity of the sealing rings to be enough to centre the piston, but the restoring force produced by the sealing rings usually is not enough by itself. For this reason, it is proposed to arrange the resilient sealing rings in sealing-carrier-rings which are displaceable at right angles to the axis of the cylinder and are supported on the piston or on the frame by means of springs. In this case, these springs (preferably compression-springs) form the above-mentioned centering device.

Another form of a centering device employs a flexurally resilient centering rod extending, in the interior of the piston, along the axis of the cylinder. One end of this rod may be secured to the piston, for example, while the other end slides in a sleeve arranged at the bottom of the cylinder-bore. However, a reversed arrangement also is conceivable. If the bearing housing causes the piston to participate in a transverse displacement, the centering rod is caused to bend, thus exerting a restoring force upon the piston. If the load is now removed from the cylinder-piston unit, allowing the piston to separate from the bearing housing, the restoring force of the centering rod again centres the piston in the cylinder-bore.

According to a third possible design of centering rod, a conical centering seat, which comes into action only when the cylinder-piston unit is in the unloaded condition, is provided in the piston and the bottom of the cylinder-bore. When the cylinder-piston unit is acted upon, and the piston moves away from the bottom of the cylinder-bore, the piston is immediately released from the centering seat and can again follow any transverse displacement of the bearing housing. As soon as the cylinder-piston unit is unloaded and the piston returns to its position of rest, it again is centered by the conical centering seat.

It is to be understood that different designs of centering device may be combined with each other. For example, it is particularly advantageous to provide the centering rod, and its associated sleeve, also with a conical centering seat.

What is common to all examples of cylinder-piston unit, as already indicated, is that radial play between the piston and the cylinder-bore is greater than the transverse play between the bearing housing and the frame. Thus, when the piston ascends, it can follow any transverse movement and/or tilting of the bearing housing, without coming into contact with the cylinder-bore. This arrangement eliminates wear and additional friction. What is important is that the difference between the two transverse plays need not be excessive, since the piston is centered again whenever it returns to its position of rest.

Different designs of the centering device, and further advantageous configurations of the cylinder-piston unit according to the invention, can be provided.

The invention is described further, by way of illustration, with reference to the accompanying drawings, in which:

FIG. 1 is a side elevational view of a bearing housing for a roll with a cylinder-piston unit constructed in accordance with one embodiment of the invention;

FIG. 1a is a plan view of the bearing housing of FIG. 1, with a partial cross-section through its linear guide-elements;

FIG. 4 is a longitudinal section through a third example of the embodiment.

Figure 2A:
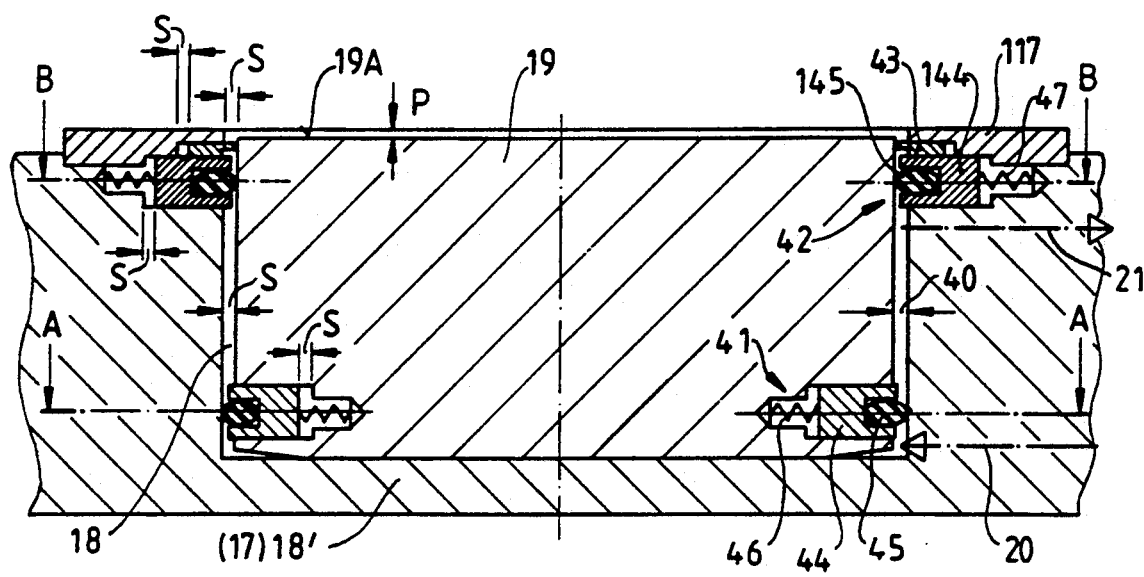
FIG. 2a shows a first example of the embodiment of the cylinder-piston unit according to FIG. 1, in longitudinal section.

Referring to the drawings, FIGS. 1 and 1a show an adjusting device for a roll 11. The roll 11 comprises a rotatable roll body 12 and a rotatable trunnion 12a which is supported rotatably in a bearing housing 13 by means of a bearing 10 illustrated diagrammatically. In the view shown in FIG. 1, bearing housing 13, and thus roll 11 as a whole may be adjusted vertically. Secured to the bearing housing 13, by means of guide-claws 15, is an end-cap 14. The claws 15 engage with a stationary end-guide-plate 16, the base of which is connected to a baseplate 17. Guide-claws 15, and guide-plate 16, constitute the linear guide-elements frequently mentioned at the beginning hereof. The sliding surfaces of the guide-plate 16 may be made of hardened stainless steel, while the sliding surfaces of end-cap 14 and guide-claws 15 may be coated with synthetic elements 15a-15d. Guide-plate 16 and baseplate 17 may be separate, or may be combined, as shown, to form a one-piece frame or "guide-stool". In any case, both the guide-plate 16 and the baseplate 17 are connected rigidly to a machine-frame 9. If a "guide-stool" 16,17 is used, it may be left with the roll if the latter has to be removed from the papermaking machine, and this greatly facilitates roll-changing. As a variant of the design illustrated, baseplate 17 and/or guide-plate 16 may be integrated with machine-frame 9.

Located in baseplate 17 are two vertical cylinder-bores 18 containing lifting pistons 19 adapted to move up and down therein. Pressurized oil may be fed to the cylinder bores through feed-ducts 20. The oil-pressure present in cylinder-bores 18 acts upon the lifting pistons 19, causing them to move bearing housing 13 away from baseplate 17. Although they are not shown in the drawing, it is obvious that control-devices are provided for switching the oil-pressure on and off and for varying the pressure. If the oil-pressure is switched off, bearing housing 13 will descend, in the arrangement shown, onto baseplate 17 under the weight of roll 11.

It is also assumed in FIG. 1 that roll 11 is pressed upwardly against a counter-roll, not shown. However, depending upon the location of the counter-roll, this pressure also may be applied in any desired direction, even downwardly, for example. In this case, the whole arrangement would be reversed, i.e. baseplate 17 would be secured to machine-frame 9 above bearing housing 13.

In order to ensure that the adjusting device is suitable for all possible arrangements and applications, the following additional precautions are taken: end-guide-plate 16 comprises a recess 22 for the roll-trunnion 12a upon which an additional bearing 23 is arranged. Located in a bridge 24, both ends of which are secured to stationary guide-plate 16 by means of screws 35, is an additional cylinder-piston unit comprising a piston 26. If roll 11 is pressed downwardly against the counter-roll, the piston 26 can raise roll 11 from the counter-roll against its own weight. Reference numerals 29 and 30 designate lubricating-oil lines in bearing housing 13.

In FIG. 1a, the width of guide-plate 16 is marked A and the thickness thereof B. It is to be understood that the distance between synthetic elements 15c and 15d (corresponding to dimension A) is slightly greater than width A. In the same way, the distance between synthetic elements 15a and 15b (corresponding to dimension B) is slightly greater than thickness B. In other words, a small amount of "transverse play" exists, in both directions of arrows A and B, between bearing housing 13 and guide-stool 16,17. The result of this is that bearing housing 13 may easily be displaced within guide-stool 16,17, but further that there may be a small amount of transverse displacement or tilting of bearing housing 13 out of its normal position.

The present invention relates to the cylinder-piston unit marked with an "X" in FIG. 1. It will be seen that the diameter of lifting piston 19 is smaller than that of cylinder-bore 18. The difference between these diameters is greater than the largest amount of transverse play occurring between bearing housing 13 and guide-stool 16,17.

Figure 2B:
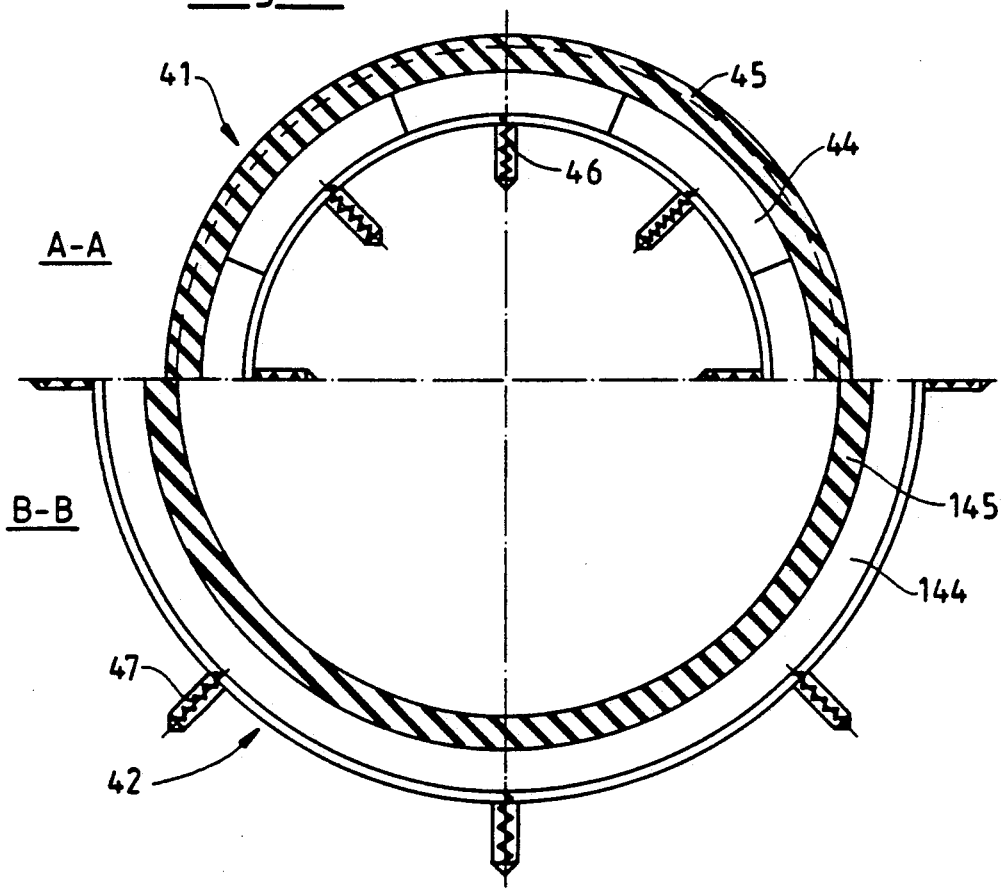
FIG. 2b shows cross-sections of the design according to FIG. 2a along the lines A—A and B—B.
Figure 3A:
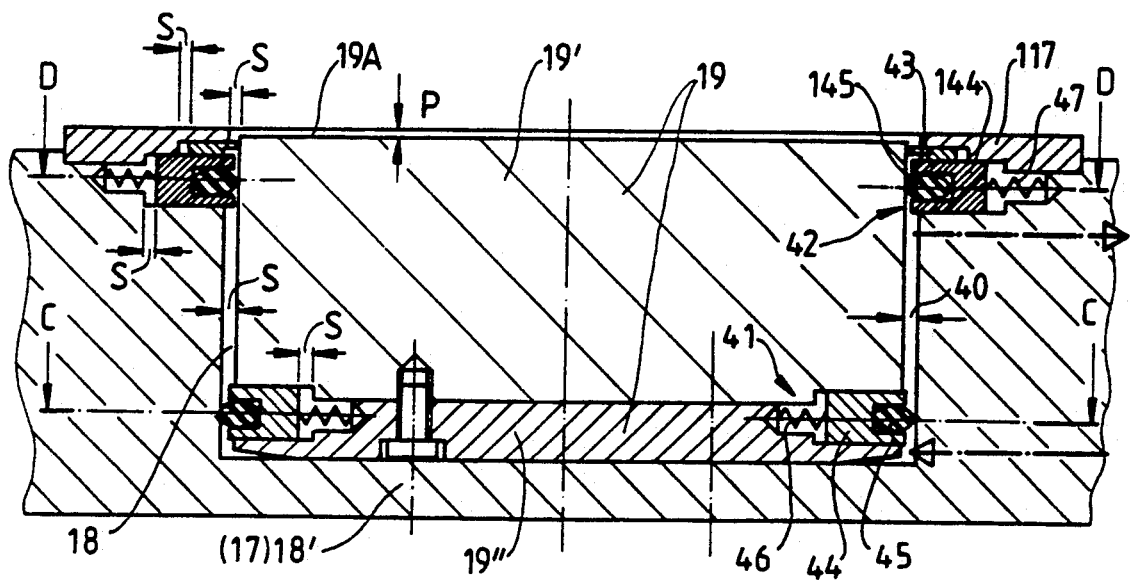
FIG. 3a shows a second example of the embodiment of the cylinder-piston unit according to FIG. 1, in longitudinal section.
Figure 3B:
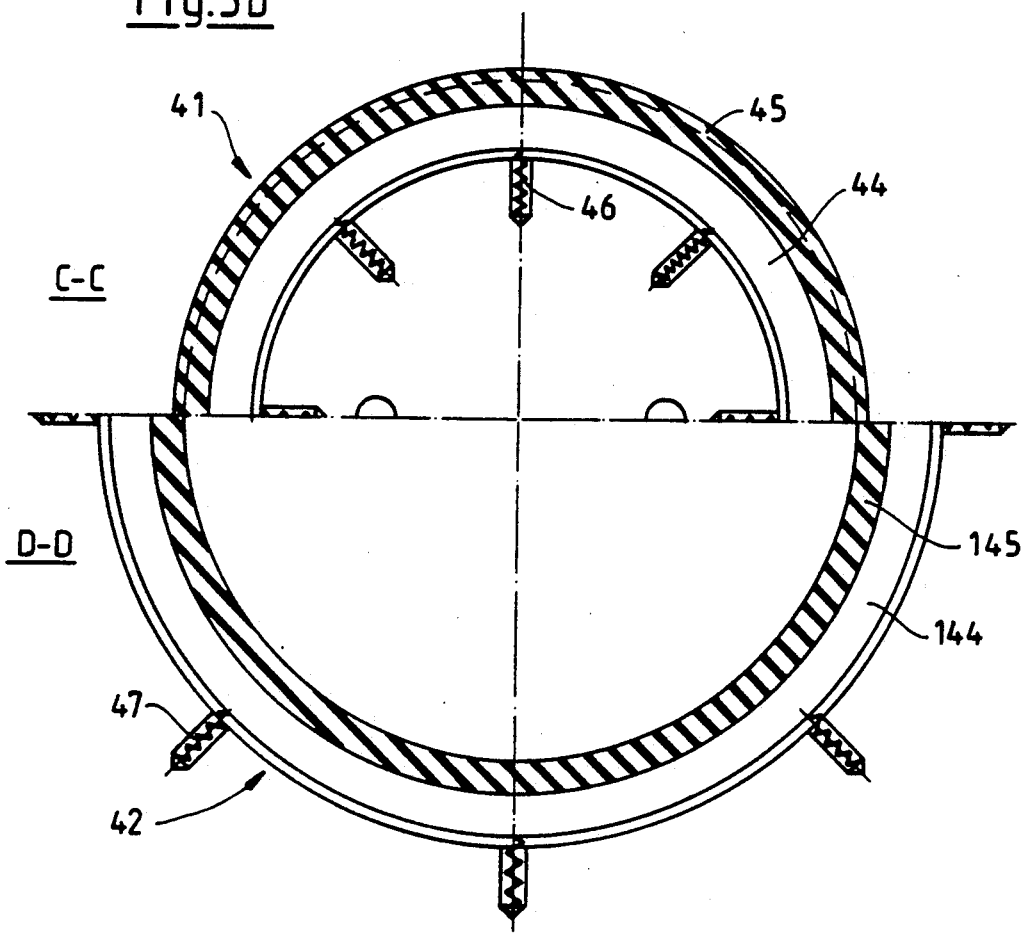
FIG. 3b shows cross-sections of the design according to FIG. 3a along the lines C—C and D—D.

In the cylinder-piston unit according to FIGS. 2a, 2b, 3a and 3b, a lifting-piston 19 is guided coaxially in the cylinder-bore 18 of a cylinder block 18' which may, at the same time be the baseplate 17 in FIG. 1. Located between lifting piston 19 and the wall of cylinder-bore 18 is an annular gap 40 of width "s". FIGS. 2a and 3a show the cylinder-piston unit in its unloaded condition, i.e. the bottom of piston 19 is seated upon the bottom of cylinder bore 18. The outer end-face of lifting piston 19, the so-called operative face 19A, lies in this case deeper, by an amount of axial play "p" (about 1 mm) than the uppermost surface of cylinder-block 18'. In the example illustrated, this is the uppermost surface of a covering ring 117.

When the cylinder-piston unit is in the unloaded condition, bearing housing 13 rests upon this uppermost surface. If the underside of lifting piston 19 is acted upon, through line 20, with pressurized oil, the said piston (which, in the ideal case, is coaxial with cylinder-bore 18) is urged upwardly. Operative face 19A thus comes up against the bearing housing and moves it upwardly.

Play "p" is necessary in order to provide lifting piston 19, in the condition of rest, with enough room to centre itself in cylinder-bore 16. In the position of rest, and in the acting direction shown, piston 19 automatically releases itself from bearing housing 13 under the force of gravity. In the opposite acting direction, release of piston 19 from the bearing housing may be effected by means of a spring, not shown. It is essential that the piston, in its position of rest, is not jammed (as a result of friction) between the bottom of cylinder-bore 18 and the bearing housing.

The annular gap 40 is bridged with the aid of two sealing-ring units 41,42. A first, lower, sealing-ring unit 41 defines the pressure-space (located at the underside of piston 19), while the second, upper, sealing-ring unit 42 seals annular gap 40 from the outside. Thus, the part of annular gap 40 located between the two sealing-ring units acts as a leakage-oil gap whence incoming oil is carried away in outlet-duct 21. Also provided, above second sealing-ring unit 42 and in cylinder-block 18', is a radial scraper-ring 43 which bears against lifting piston 19 and is mounted in such a manner that it can follow, without any resistance, transverse displacements of the piston 19.

Each sealing-ring unit 41,42 consists of a resiliently mounted sealing-carrier-ring 44 or 144 having a resilient sealing ring 45,145 projecting radially into annular gap 40. Each carrier-ring 44,144 must be radially displaceable by the width of gap "s" in annular gap 40, so that it may follow any transverse displacement of the lifting piston 19.

The lower sealing-carrier-ring 44 is inserted into the lifting piston 19 so that sealing ring 45 may slide along the wall of cylinder-bore 18. The upper sealing-carrier-ring 144 is inserted into cylinder-block 18', and sealing ring 145 thereof, and slides upon the outside of lifting piston 19. Located between lower sealing-carrier-ring 44 and piston 19 are several compression-springs 46 distributed around the periphery. In a similar manner, several compression-rings 47 are located between upper sealing-carrier-ring 144 and cylinder-block 18', also distributed around the periphery. Whenever lifting piston 19 reaches its position of rest, it is centred in cylinder-bore 18 by compression springs 46,47. As compared with the transverse forces acting by bearing housing 13 upon the lifting piston 19 when pressure is applied, the force of springs 46,47 must be small, so that the piston 19 may easily follow these transverse forces.

The configurations according to FIGS. 2a/2b and 3a/3b differ as follows: in FIGS. 2a/2b, lifting piston 19 is in one piece. For this reason, lower sealing-carrier-ring 44 consist of several segments located in an annular groove in the piston and held together by resilient sealing ring 45.

In FIGS. 3a/3b, lower sealing-carrier-ring 44 is in one piece. Lifting piston 19 is therefore in two pieces, to wit a base 19' and a piston cover 19" between which sealing-carrier-ring 44 is arranged.

When the operating strokes of lifting piston 19 are very small, it is possible (in contrast to the drawing) to arrange both sealing rings in the piston 19. The advantage of this is that two cylinder-piston units can be arranged closer together than in the design shown.

In FIG. 4, lifting piston 19 (displaceable in bore 18 of a cylinder-liner 118) is divided into an annular piston body 191 and a coaxial centering rod 193 which is inserted, by means of a flange 192, from the operative face 19A, into piston-body 191. When piston 19 is in its position of rest, centering rod 193 extends to the bottom of cylinder-bore 18, where a coaxial sleeve 194 is secured to the cylinder-block by means of a flange 195. Centering rod 193 is guided in the sleeve by a sliding block 196. An annular gap of width "s" remains between sleeve 194 and annular piston-body 191, and between centering rod 193 and sleeve 194.

In its elevated condition, therefore, piston 19 can carry out, largely unimpededly, transverse displacements of the order of dimension "s". Only sliding block 196 remains centered. Centering rod 193, therefore, bends when the piston is displaced transversely. This produces a restoring force which centres the piston when it returns to its position of rest. This design also permits possible tilting of the piston.

As an addition or an alternative to the centering action of sliding block 196 on centering rod 193, a centering seat 197 may be formed upon sleeve 194 and centering rod 193 by means of two complementary conical surfaces. This centering seat also becomes effective as the lifting piston 19 approaches its position of rest, forcing the piston into an exactly coaxial position as it slides into the centering seat 197.

Sealing rings 41a, 42a, bridging annular gap 40 between piston-body 191 and cylinder-bore 18, may be of simpler design than in FIGS. 2a-2b since, according to FIG. 4, they perform no essential centering function. First resilient sealing ring 41a is inserted directly into piston-body 191; second resilient sealing ring 42a rests in a sealing-carrier-ring 44' which is seated immovably in cylinder-block 18'.

In conclusion, it should be noted that a combination of sealing-ring units 41 and 42 (FIGS. 2a-3b) and centering devices 193-197 according to FIG. 4 is conceivable. Modifications are possible within the scope of the invention.

The embodiments of the invention in which an exclusive property or privilege is claimed are defined as follows:

1. In a cylinder-piston unit for displacing a bearing housing for a rotatable roll at right angles to the longitudinal axis thereof, the displaceable bearing housing is arranged in a stationary frame accommodating said piston-cylinder unit and is guided therein by means of linear guide-elements extending in the direction of displacement, the improvement wherein:
   (a) the stationary frame comprises a cylinder-bore, the axis of which runs in the direction of displacement, and which contains an axially-mobile piston, the outer end-face of which engages with the bearing housing;
   (b) the diameter of the cylinder-bore is greater than the diameter of the piston, thus providing, between the cylinder-bore and the piston, an annular gap in which resilient sealing rings are arranged;
   (c) the difference between the diameters of the cylinder-bore and that of the piston is greater than the greatest possible amount of play of the linear guide-elements at right angles to the direction of displacement of the bearing housing;
   (d) the axial length of the piston is less than the depth of the cylinder-bore; and
   (e) a centering device engages with the piston in such manner that, in the unloaded condition of the cylinder-piston unit, said piston is centered in the cylinder-bore.

2. The cylinder-piston unit of claim 1, wherein, in said centering device:
   (a) the resilient sealing rings rest in sealing-carrier-rings which are displaceable radially; and
   (b) the sealing-carrier-rings are supported at right angles to the axis of the cylinder-bore by a series of springs on the piston or on the frame whereby when the cylinder-piston unit is in the unloaded condition, the springs centre the piston in the cylinder-bore.

3. The cylinder-piston unit of claim 2, wherein a first sealing ring, which bears resiliently against the cylinder-bore, is arranged with its sealing-carrier-ring in the piston close to the inner end-face thereof, and a second sealing ring, which bears resiliently against the outer surface of the piston, is arranged with its sealing-carrier-ring in the wall of the cylinder-bore, close to the outer end thereof.

4. The cylinder-piston unit of claim 3, wherein there is provided between the operating surface of the piston and the second sealing ring is a radially displaceable scraper ring bridging an annular gap.

5. The cylinder-piston unit of claim 2 wherein the piston is made in one piece, and the sealing-carrier-ring of the sealing ring is made up of ring-segments.

6. The cylinder-piston unit of claim 2 wherein the piston consists of a base and a piston-cover, and the sealing-carrier-ring of the first sealing ring is made in one piece and is inserted between the base and the piston-cover.

7. The cylinder-piston unit of claim 1, wherein said centering device comprises a flexurally resilient centering rod extending along its axis which bends when the piston is displaced transversely and which centers the piston in the cylinder-bore when the cylinder-piston unit is in the unloaded condition.

8. The cylinder piston unit of claim 7, wherein the centering rod is secured to the piston and is guided in a sleeve arranged at the bottom of the cylinder-bore.

9. The cylinder-piston unit of claim 8, wherein the centering rod comprises a sliding block guided in the sleeve and lying on a level with the first sealing ring.

10. The cylinder-piston unit of claim 1 wherein conical supporting surfaces which complement each other are provided on the piston and at the bottom of the cylinder-bore, said surfaces engaging in each other, when the cylinder-piston unit is in the unloaded condition, and acting as a centering device.

* * * * *